W. C. MORRISON.
AUTOMOBILE HOISTING AND TILTING APPARATUS.
APPLICATION FILED OCT. 1, 1919.
1,367,073.
Patented Feb. 1, 1921.
2 SHEETS—SHEET 1.
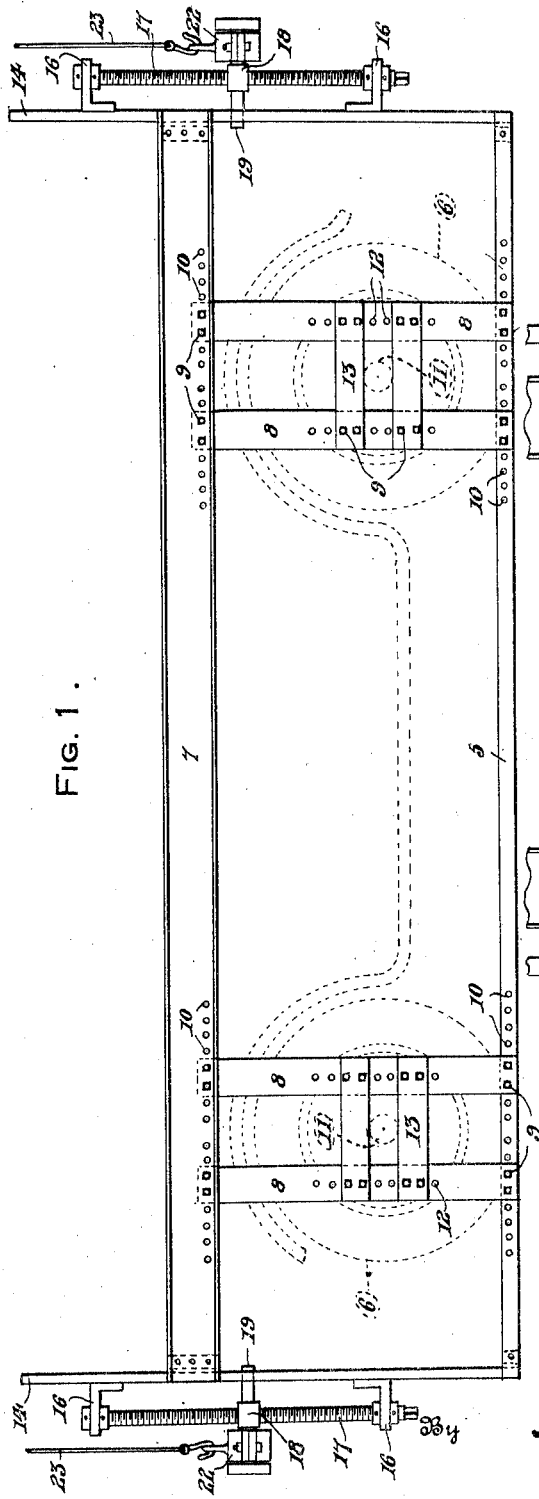
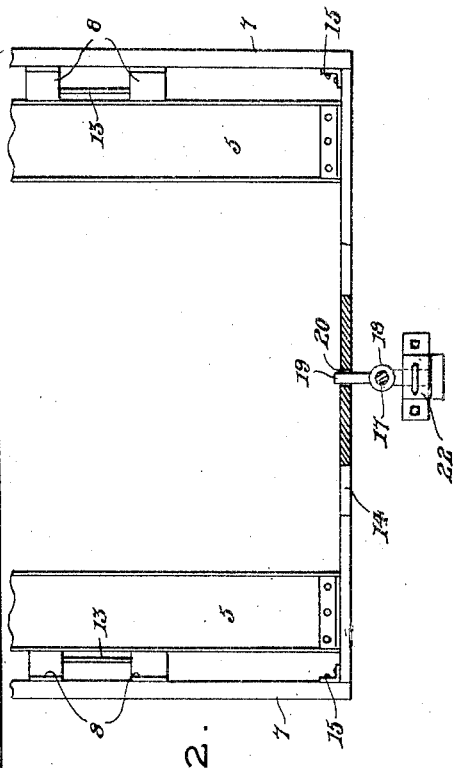
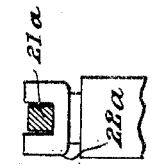
Inventor
William C. Morrison
Attorney

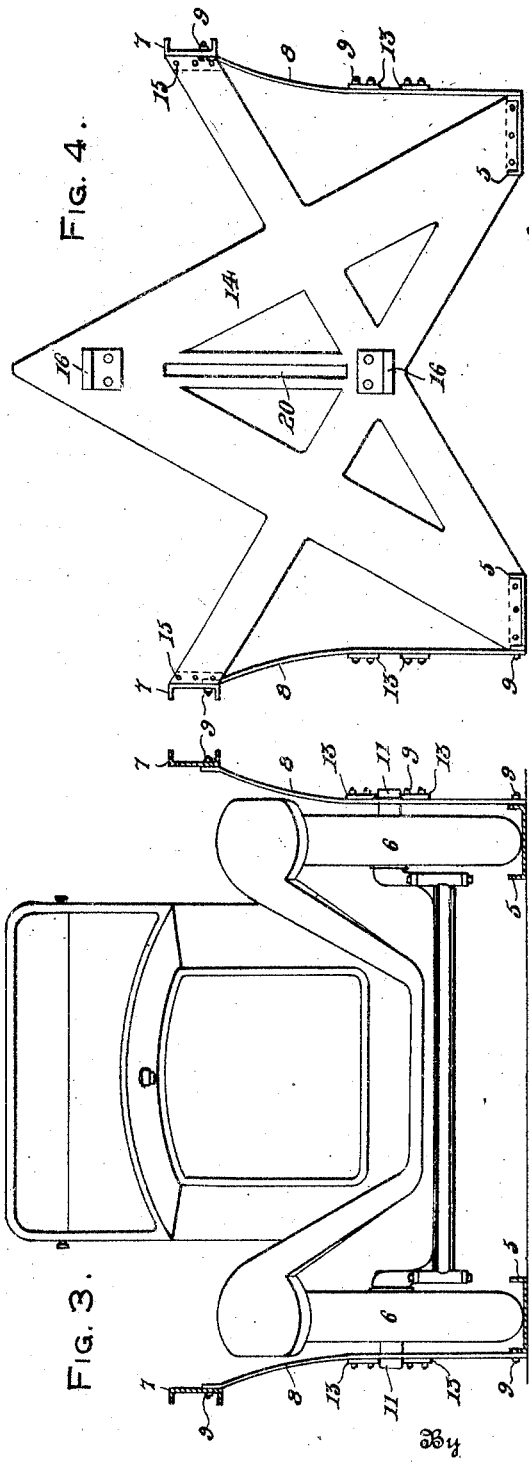
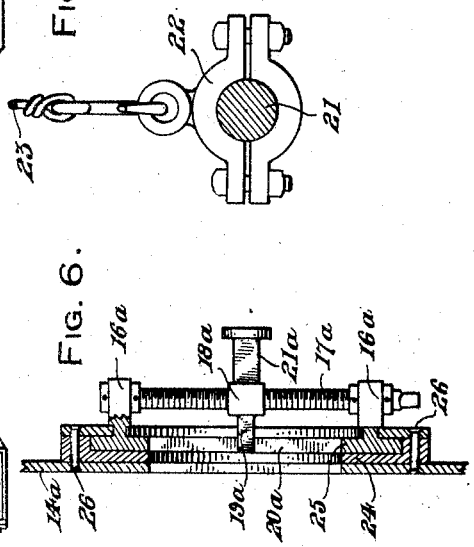
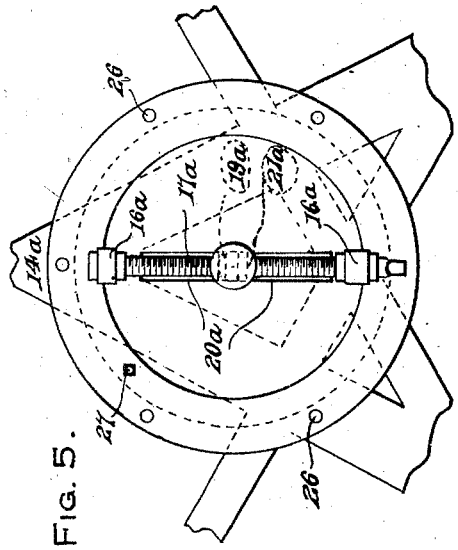

UNITED STATES PATENT OFFICE.

WILLIAM C. MORRISON, OF PITTSBURGH, PENNSYLVANIA, ASSIGNOR TO MORRISON CORPORATION, OF DOVER, DELAWARE, A CORPORATION OF DELAWARE.

AUTOMOBILE HOISTING AND TILTING APPARATUS.

1,367,073.   Specification of Letters Patent.   Patented Feb. 1, 1921.

Application filed October 1, 1919. Serial No. 327,668.

*To all whom it may concern:*

Be it known that I, WILLIAM C. MORRISON, a citizen of the United States of America, residing at Pittsburgh, in the county of Allegheny and State of Pennsylvania, have invented certain new and useful Improvements in Automobile Hoisting and Tilting Apparatus, of which the following is a specification.

This invention relates to certain new and useful improvements in automobile hoisting and tilting apparatus and has particular reference to an apparatus of this kind which is utilized to enable repairs to be quickly made with respect to the under parts of an automobile without the necessity of providing repair pits or necessitating repairman lying flatly upon the ground as is the usual practice at present.

The primary object of the present invention is to provide an extremely efficient means for hoisting an automobile clear of the floor so as to enable a repairman to stand up when making repairs, novel means being provided whereby the automobile is pivotally suspended for lateral tilting movement so that the weight of the automobile is substantially equalized at all sides of the pivots and consequently little power is necessary to cause tilting of the automobile.

A further object of the invention is to provide adjustable pivots whereby the weight of different automobiles may be equalized with respect thereto.

A still further object of the invention is to provide a novel form of cradle for receiving the automobile to be hoisted or lifted, efficient means being also provided to retain the automobile against movement when properly disposed in the cradle.

With the above general objects in view and others that will become apparent as the nature of the invention is better understood, the same consists in the novel form, combination and arrangement of parts hereinafter more fully described, shown in the accompanying drawings and claimed.

In the drawings forming a part of this specification, and in which like reference characters indicate corresponding parts throughout the several views, Figure 1 is a side elevational view of an apparatus constructed in accordance with the present invention, a portion of an automobile being shown by dotted lines disposed within the cradle, Fig. 2 is a top plan view of one end portion of the device shown in Fig. 1, parts being broken away.

Fig. 3 is an end elevational view of the device shown in Fig. 1 with the end gates removed and an automobile disposed upon the channel tracks of the cradle, Fig. 4 is an end elevational view of the device shown in Fig. 1 with the adjustable pivot removed, Fig. 5 is a fragmentary elevational view of one of the end gates with a modified form of pivot carrying means adapted to retain the cradles tilted, Fig. 6 is a central vertical sectional view of the device shown in Fig. 5, Fig. 7 is a sectional detail view showing the pivotal connection between the hoisting or lifting means and the cradle pivot stud, and Fig. 8 is a sectional detail view of the connection of the feed nut stud with a hoisting or lifting jack head as employed with the construction of Figs. 5 and 6.

Referring more in detail to the several views, the present device embodies a cradle including a pair of spaced parallel horizontal tracks 5 of substantially channel form and disposed sufficient distance apart to enable the opposite supporting wheels 6 of the automobile to ride thereon. A pair of side channel bars 7 are disposed above the tracks 5 to form longitudinal side bars at the top of the cradle, and these bars are connected to the tracks 5 by suitable upright bars 8. The bars 8 are bolted to the bars 7 and tracks 5 as at 9, a number of perforations 10 being provided in the tracks 5 and bars 7 so as to permit the bars 8 to be adjustably positioned at opposite sides of the hub 11 of each automobile wheel as shown in Fig. 1. In practice the bars 8 will of course be disposed against the opposite sides of the hubs 11 instead of spaced therefrom as shown so as to prevent forward or backward movement of the automobile upon the tracks 5. The bars 8 are provided with a number of vertical perforations 12 so as to enable the pairs of transverse bars 13 to be bolted adjustably thereto so that the bars 13 engage the upper and lower sides of the hubs 11 and consequently prevent vertical displacement of the automobile relative to the tracks 5. It will thus be apparent that by reason of the provision of the perforations 10 and 12, the bars 8 and 13 may be adjustably positioned so as to accord with the different makes of automobiles to be repaired.

At each end of the tracks 5 and side bars 7 there is provided an end gate 14 of any desirable form, although the construction shown is preferable in view of the fact that the same embodies lightness and strength These end gates are bolted or otherwise secured to the side bars 7 and tracks 5 as at 15 so as to form a rigid construction in the form of a cradle for containing the automobile while being hoisted or lifted.

In practice, the tracks 5 are disposed upon the ground in proper spaced relation and the automobile is run onto the same until positioned as shown in Figs. 1 and 3. The bars 7, 8 and 13 are then assembled and connected to the tracks 5 so that the automobile is held against movement, whereupon the end gates 14 are secured in position.

In the form of the invention illustrated in Figs. 1 to 4 inclusive, the end gates 14 each have a pair of brackets 16 rigidly secured thereto in vertical alinement for rotatably supporting the upright feed screw 17. A nut 18 is threaded upon the screw 17 and has a lug 19 projecting rearwardly therefrom into the vertical guide slot 20 which is provided in the end gate so as to hold the nut against rotation and allow vertical movement of the nut when the feed screw is rotated. Projecting outwardly from each nut 18 is a pivot stud 21 adapted to be journaled in the hoisting or lifting head 22 which may be attached to a hoisting cable 23 as shown or which may be provided on the upper end of a hoisting or lifting jack.

It will be seen that the cradle may be readily swung to laterally tilt the automobile about the pivots 21 when hoisted clear of the ground, and as the pivot studs 21 are located centrally between the tracks 5, the same amount of weight of the automobile will be disposed at opposite sides of said pivot studs. It is also obvious that different makes of automobiles have their wights differently distributed vertically, i. e., some automobiles are more "top heavy" than others. Consequently, the pivot studs 21 are adjusted vertically in accordance with the particular car being repaired so as to insure substantially the same weight above and below the pivot studs whereby the automobile may be easily manually tilted to the angle desired and there propped or otherwise held. In this way the utilization of powerful motors is rendered unnecessary to accomplish the tilting of the automobile and the likelihood of the complete turning over of the automobile is reduced to a minimum.

If desired, some means may be provided on the cradle to retain the same tilted and I have illustrated in Figs. 5 and 6 one manner of carrying the same out. In these figures one of the end gates is indicated at $14^a$ and has a flanged disk 24 rigidly secured thereto. Concentric with and disposed against the disk 24 is a second disk 25 which is rotatably retained in position by a fastening ring 26 which is suitably rigidly fastened to the disk 24. The brackets $16^a$ in which the feed screw $17^a$ is journaled are rigidly carried by the smaller disk 25, and the feed nut $18^a$ provided with the squared stud $21^a$ is threaded upon said feed screw. The nut $18^a$ has a guide lug $19^a$ which projects into the vertical elongated slot $20^a$ provided in the disk 25. A set screw 27 or the like is threaded through the fastening ring 26 and has its inner end arranged to bear against the disk 25 so as to retain the disks 24 and 25 against relative rotation. In this form of the invention the movement of the disks 24 and 25 rotarily relative to each other serves the purpose of allowing tilting of the cradle as does the rotary movement of the studs 21 within the heads 22 of the form of the invention shown in Figs. 1 to 4 inclusive and 7. For this reason, the stud $21^a$ of Figs. 5 and 6 is squared to fit within a correspondingly formed opening or socket of a hoisting head $22^a$ of a jack as shown in Fig. 8 so as to prevent rotary movement of said stud $21^a$ in the head $22^a$. It will of course be understood that two end gates $14^a$ and their associated devices are employed, one at each end of the cradle in accordance with the use of the end gates 14 as shown in Fig. 1. With the construction of Figs. 5 and 6, the feed screws $17^a$ are maintained vertical at all times so as to place little detrimental strain upon the threads thereof.

From the foregoing description it is believed that the construction and operation of the present invention will be readily understood and its advantages appreciated.

While the forms of the invention herein shown and described are what are believed to be the preferable embodiments thereof, it is nevertheless to be understood that minor changes may be made in part or in whole without departing from the spirit and scope of the invention as claimed.

What I claim is:—

1. The combination with an automobile cradle and means for permitting lifting thereof, of means disposed centrally between the sides of said cradle and interposed between the cradle and said first named means to permit lateral tilting of said cradle, and means to vertically adjust said last named means whereby the weight of an automobile supported by the cradle is substantially equalized both above and below said last named means.

2. An automobile tilting apparatus including a lifting element, a cradle, and a vertically adjustable member disposed centrally between the sides of the cradle and pivotally connected to said lifting element.

3. An automobile tilting apparatus including a cradle, lifting elements adjacent each end of said cradle, and a vertically adjustable member adjacent each end of said cradle pivotally connected to each lifting element and disposed centrally between the sides of the cradle.

4. In an automobile tilting apparatus, an automobile supporting cradle having end members, feed screws disposed substantially centrally between the sides of the cradle and rotatably supported by said end members, vertically adjustable nuts threaded upon said feed screws, means to retain said nuts against rotation, lifting elements associated with said nuts, and means interposed between the lifting elements and the end members to permit lateral tilting of the cradle.

5. In an automobile tilting apparatus, a cradle composed of a pair of longitudinal parallel spaced tracks, a pair of parallel spaced side bars disposed longitudinally above said tracks, vertically disposed bars connecting said side bars with said tracks and adjustable longitudinally of the latter for engaging the opposite sides of the hubs of automobile supporting wheels to retain the automobile against movement upon said tracks, and means to retain an automobile against vertical movement relative to said tracks.

6. In an automobile tilting apparatus, a cradle composed of a pair of longitudinal parallel spaced tracks, a pair of parallel spaced side bars disposed longitudinally above said tracks, vertically disposed bars connecting said side bars with said tracks and adjustable longitudinally of the latter for engaging the opposite sides of the hubs of automobile supporting wheels to retain the automobile against movement upon said tracks, and means to retain an automobile against vertical movement relative to said tracks, said last named means comprising horizontal bars adjustable vertically relative to and carried by said vertical bars for engaging the upper and lower sides of the hubs of the automobile supporting wheels.

7. In an automobile tilting apparatus, a cradle composed of a pair of longitudinal parallel spaced tracks, a pair of parallel spaced side bars disposed longitudinally above said tracks, vertically disposed bars connecting said side bars with said tracks and adjustable longitudinally of the latter for engaging the opposite sides of the hubs of automobile supporting wheels to retain the automobile against movement upon said tracks, means to retain an automobile against vertical movement relative to said tracks, end gates detachably fastened to the tracks and side bars, and hoisting means associated with said end gates.

8. In an automobile tilting apparatus a supporting cradle comprising a pair of tracks and a pair of upper side bars, pairs of vertically disposed bars connecting each side bar with one of said tracks, and horizontally disposed pairs of bars connecting each pair of vertically disposed bars, said vertically and horizontally disposed pairs of bars arranged to engage parts of an automobile to retain the latter against movement relative to said tracks.

9. In an automobile tilting apparatus, a cradle including end gates, disks rigidly fastened centrally to said end gates, further disks rotatably supported by said first named disks, means to retain said disks against relative rotation, vertical feed screws rotatably carried by said second named disks, nuts threaded upon said screws, means to retain said nuts against rotation while permitting vertical movement thereof upon rotation of said screws, and lifting elements non-rotatably connected to said nuts.

10. The combination with an automobile tilting apparatus comprising a cradle composed of a pair of longitudinal parallel spaced tracks, vertically disposed end members removably secured to said tracks, and vertically adjustable pivot studs mounted on each of said end members, of means having a pivotal connection with said studs and adapted to lift said apparatus vertically.

11. The combination with an automobile cradle and means for supporting the same above the ground, of means disposed centrally between the sides of said cradle and interposed between the cradle and said supporting means to permit lateral tilting of said cradle, and means to vertically adjust said last named means whereby the weight of an automobile supported by the cradle may be substantially equalized both above and below said last named means.

12. An automobile tilting apparatus including a supporting element, a cradle, and a vertically adjustable member disposed centrally between the sides of the cradle and pivotally connected to said supporting element.

13. An automobile tilting apparatus including a cradle, supporting elements adjacent the ends of said cradle, and a vertically adjustable member adjacent each end of said cradle pivotally connected to each supporting element and disposed centrally between the sides of the cradle.

14. The combination with an automobile cradle and means for supporting the same above the ground, of vertically adjustable pivot studs disposed centrally between the sides of the cradle and pivotally connected to said supporting element.

15. The combination with an article support and means for supporting the same above the ground, of means disposed between the sides of said article support and interposed between the article support and said supporting means to permit lateral tilting of said article support, and means to vertically adjust said last named means whereby the weight of an article carried by the article support may be substantially equalized both above and below said last named means.

16. An article tilting apparatus including a supporting element, an article support, and a vertically adjustable member disposed between the sides of the article support and pivotally connected to said supporting element.

In testimony whereof I affix my signature.

WILLIAM C. MORRISON.